UNITED STATES PATENT OFFICE.

ERNST J. KRAUSE, OF LANCASTER, PENNSYLVANIA.

IMPROVED PROCESS FOR MAKING BEER.

Specification forming part of Letters Patent No. 48,413, dated June 27, 1865.

*To all whom it may concern:*

Be it known that I, ERNST J. KRAUSE, of Lancaster, in the county of Lancaster and State of Pennsylvania, have invented a new and Improved Mode or Process for Manufacturing and Brewing Bottom-Fermenting Beer, (a combined ale and lager;) and I do hereby declare that the following is a full and exact description thereof, so that any one skilled in the business will readily comprehend the entire process and be enabled to use my invention to his profit and benefit of the consumer.

The object of this invention is to facilitate the production of a wholesome and palatable beverage, known as "bottom-fermenting beer," in less time and at a great saving of labor and materials, by means of the ordinary brewer's kettle and appliances, from the same materials as used heretofore, under erroneous impressions, however, at a great waste of time and ingredients, as I will show, arising from the want of a correct knowledge of the proper mode of manipulating and chemical results of the process.

Beer boiled in the ordinary brewer's kettle is well known to be milder and of a richer flavor than when steam is employed as an agent for boiling. To say nothing of the drugs so frequently used for clearing the beer and other purposes, in most cases deleterious compounds are formed, and should be avoided.

I have followed the business of a brewer for a number of years, and verily believe I am acquainted with all the processes used or known in this country or in Europe, and have given my especial attention to experimenting during a period of eight years past, in order to discover the most economical method to produce a superior article.

Ordinarily it requires from two hundred and twenty-five to two hundred and fifty bushels of malt and one hundred and seventy-five pounds of hops in making one hundreds barrels of beer of this kind. The idea prevailed also that no water should be used at a heat above 176° Fahrenheit, lest the malt should be scalded and injured. Besides that, it required from four to six hours soaking in water of even a lower temperature to extract all the substance from the malt. (This long soaking I found was the cause of developing the viscid gluten, subsequently delaying the process of finishing.)

By my process I am enabled to make one hundred barrels of beer (of the like strength and sized barrels) from one hundred and seventy-five bushels of malt and one hundred pounds of hops, and in the space of two and a half hours' time I draw all the sweetness and substance out of the malt by increasing the heat of the water and mode of applying it. I may add that an experienced brewer is able to judge the quantity of water required to make one hundred barrels of beer by allowing about ten barrels for waste by evaporation and during fermentation.

Having now stated the advantages resulting from my mode, I will specify my plan of procedure in order, taking it for granted that the terms used by brewers will be readily understood with reference to the capacity of the vessels employed and mentioned. It is proper to mention that the result of my process is a new kind of beer, intermediate between ale and lager, and is equally well adapted for summer and winter. Besides, the short process will enable an extensive brewery to boil three kettles in a day, making three hundred barrels.

Having a sufficient amount of water in my kettle at such a degree of heat required, I draw off fifty-eight and one-third barrels into my mash-tub, (one-third barrel to the bushel.) To this water, at 178° Fahrenheit, I now put the one hundred and seventy-five bushels of malt and stir it round briskly, so as to mix it as quick as possible, and get it all thoroughly wet and every grain separated for the action of the hot water. This being accomplished, I leave it to soak for one hour. I then apply the second water, heated to 180° Fahrenheit, in half the former proportion—that is, twenty-nine and one-sixth barrels, (one-sixth barrel to the bushel.) This second water requires no mixing. I suffer it to remain thus for one and one-half hour longer, after which time I draw about eight or ten barrels of the liquor from the mash-tub into the under tub. This being done, I close the faucet. I then take the remaining water from the kettle, or fifty-eight and one-third barrels, heated to 182° Fahrenheit, and run it into the mash-tub without mixing. The kettle being now empty, I pump the contents of the under tub into it, and continue to draw the liquor from the malt and pump it into the kettle until it contains seventy-five barrels. 1 then close the faucet of the mash-tub and put half the quantity, or fifty pounds, of hops into the kettle. I then wait till the liquor boils, which it usually does in half an hour or an hour's time. I continue drawing and pumping the liquor into the kettle, a little at a time, so as not to arrest the boiling process, until one hundred and twenty barrels are thus put into the kettle, during which time I also add from six to eight barrels of cold water to the malt in the mash-tub, for the purpose of washing the grain from all the extracted matter. When the contents of the kettle have boiled for about one hour the density may be tested by means of a saccharometer for determining the specific gravity of worts. By the use of Southworth's scale, if desirable to bring it to the strength of sixteen pounds to the barrel, when the liquor has attained a density of fourteen and one-half pounds, I add the balance or remaining fifty pounds of the hops, and continue the boiling until I attain the desired strength—sixteen pounds. The contents of the kettle are then passed through the hop screen or sieve into the cooler, where it is left to cool down to 46°, when it is drawn from the cooler into the fermenting-tub, adding thereto one-half pound of yeast to every barrel of its contents. It is now suffered to rest and go through the fermenting process until the weight is reduced from sixteen to four and one-half or five pounds. At this stage it is drawn into the resting-barrels, where it remains for two or three days to settle. It is now drawn into barrels about half full of clean chips of beech-wood, (to purify it from any remaining portion of yeast.) To the contents (for each barrel containing thirty-two gallons of the fermented liquor) I now put three gallons of young beer—*i. e.*, beer in the first stage of fermentation—to make it lively. It is now suffered to remain for a day to work off. The bung is now put in firmly, and after two days' more rest the beer is ready to be drawn into barrels or casks, and is now ready for consumption, being completed and ready for use in about twelve or fourteen days, yielding a quality of beer highly relished, of a brisk and sparkling appearance, and preferred over any other brought before the public.

I am aware that there are many modes of manipulating, and every brewer may imagine his mode of operating equal to any other. Having lately been called to several of our most extensive brewing establishments for the purpose of imparting instructions, and believing the mode herein described is new and a great improvement, I feel it my duty to secure myself, so far as a patent may protect me, for years of experimenting, resulting finally in my new process and new beverage.

What I claim as my invention, and desire to secure by Letters Patent, is—

The mode of manipulating or process for making bottom-fermenting beer, as herein set forth and distinctly specified.

ERNST J. KRAUSE.

Witnesses:
JOHN M. AMWEG,
JACOB STAUFFER.